United States Patent [19]

Leitz et al.

[11] Patent Number: 5,047,480

[45] Date of Patent: Sep. 10, 1991

[54] THERMOPLASTIC MOLDING COMPOSITIONS

[75] Inventors: Edgar Leitz; Ulrich Jansen, both of Dormagen, Fed. Rep. of Germany; Hans-Jürgen Kress, Pittsburgh, Pa.; Horst Peters, Leverkusen, Fed. Rep. of Germany; Jochen Schoeps, Krefeld, Fed. Rep. of Germany; Leo Morbitzer, Cologne, Fed. Rep. of Germany

[73] Assignee: Bayer Aktiengesellschaft, Leverkusen, Fed. Rep. of Germany

[21] Appl. No.: 131,091

[22] Filed: Dec. 10, 1987

[30] Foreign Application Priority Data

Dec. 13, 1986 [DE] Fed. Rep. of Germany ....... 3642645

[51] Int. Cl.⁵ .............................................. C08L 35/00
[52] U.S. Cl. .................................................... 525/207
[58] Field of Search ......................................... 525/207

[56] References Cited

U.S. PATENT DOCUMENTS

| | | | |
|---|---|---|---|
| 4,381,373 | 4/1983 | Ikuma | 525/71 |
| 4,402,902 | 9/1983 | Falk et al. | 264/349 |
| 4,558,098 | 12/1985 | Kamata et al. | 525/207 |
| 4,659,790 | 4/1987 | Shimozato et al. | 525/70 |

FOREIGN PATENT DOCUMENTS

| | | |
|---|---|---|
| 0767255 | 11/1971 | Belgium ............... 525/207 |
| 0264791 | 4/1988 | European Pat. Off. . |
| 2091500 | 1/1972 | France . |
| 2496109 | 6/1982 | France . |
| 1316330 | 5/1973 | United Kingdom . |

Primary Examiner—Marion E. McCamish
Assistant Examiner—Susan Berman
Attorney, Agent, or Firm—Connolly and Hutz

[57] ABSTRACT

Thermoplastic molding compositions containing
a. from 1 to 99 parts by weight of a thermoplastic copolymer of
   from 40 to 70 parts by weight methyl methacrylate,
   from 20 to 50 parts by weight α-methyl styrene and
   from 5 to 15 parts by weight acrylonitrile,
b. from 1 to 99 parts by weight of a statistical, thermoplastic copolymer of
   from 70 to 95 parts by weight styrene and from 5 to 30 parts by weight maleic acid anhydride.

4 Claims, No Drawings

THERMOPLASTIC MOLDING COMPOSITIONS

This invention relates to thermoplastic molding compositions containing:

a. from 1 to 99 parts by weight, preferably from 5 to 95 parts by weight and more preferably from 10 to 90 parts by weight of a thermoplastic copolymer of from 40 to 70 parts by weight and preferably from 50 to 60 parts by weight and more preferably 55.5 parts by weight methyl methacrylate, from 20 to 50 parts by weight, preferably from 30 to 40 parts by weight and more preferably 34.5 parts by weight α-methyl styrene and from 5 to 15 parts by weight, preferably from 7 to 13 parts by weight and more preferably 10 parts by weight acrylonitrile, b. from 1 to 99 parts by weight, preferably from 5 to 95 parts by weight and more preferably from 10 to 90 parts by weight of a statistical, thermoplastic copolymer of from 70 to 95 parts by weight and preferably from 78 to 90 parts by weight styrene and from 5 to 30 parts by weight and preferably from 10 to 22 parts by weight maleic acid anhydride.

The molding compositions according to the invention of a. and b. are "compatible" mixtures, as reflected in the occurrence of only one loss modulus maximum in the thermoplast and only one glass transition point the position of which is dependent on the particular compositions of the mixtures of a. and b.

The heat deflection temperature under load of the molding compositions according to the invention extends from that of component a. to that of component b. and may be adjusted as required through the choice of the mixing ratio.

By far the majority of plastics are incompatible with one another. It was therefore surprising to find that mixtures of components a. and b. according to the invention are completely miscible in the composition range according to the invention.

Mixtures of styrene/maleic acid anhydride copolymers with certain other vinyl copolymers are known.

DE-OS 1 950 599 describes transparent mixtures of high deflection temperature under load consisting of styrene c or (α-methyl styrene)/maleic acid anhydride and styrene or (α-methyl styrene)/acrylonitrile or (methacrylonitrile) copolymers.

DE-OS 2 024 944 describes transparent molding compositions of high deflection temperature under load consisting of styrene/maleic acid anhydride copolymers and methyl methacrylate/styrene/alkyl acrylate copolymers.

DE-OS 2 229 129 describes transparent, glass fiber-reinforced molding compositions of styrene/maleic acid anhydride copolymers and methyl methacrylate/styrene copolymers.

DE-OS 3 332 279 describes transparent thermoplastic molding compositions of high deflection temperature under load consisting of styrene/maleic acid anhydride copolymers and styrene/acrylonitrile copolymers, the ratio by weight of acrylonitrile to maleic acid anhydride being lower than 1.45 and greater than 0.7.

U.S. Pat. No. 4 451 617 and U.S. Pat. No. 4 408 010 describe molding compositions of high deflection temperature under load consisting of styrene/maleic acid anhydride copolymers and styrene/maleic imide copolymers.

Copolymers according to component a. are known and may be prepared by radical copolymerization, more especially by emulsion, suspension, solution or mass polymerization. Copolymers according to component a. generally have molecular weights $M_w$ of from 15 kg/mole to 200 kg/mole.

Copolymers according to component b. are also known. They have a statistical structure and are preferably prepared by mass or solution polymerization with incomplete reaction from the corresponding monomers. Copolymers according to component b. generally have molecular weights $M_w$ of from 50 kg/mole to 300 kg/mole.

The molding compositions according to the invention of components a. and b. may contain the usual additives, such as stabilizers, pigments, flow aids, flameproofing agents, mold release agents and/or antistatic agents, in the usual quantities.

The molding compositions according to the invention of components a. and b. and, optionally, other known additives may be prepared by mixing the constituents in known manner and then melt-compounding or melt-extruding the resulting mixture at temperatures of from 200 to 300° C. in standard machines, such as internal kneaders, extruders or twin-screw extruders. Components a. and b. may also be dissolved in a suitable organic solvent and then concentrated by evaporation in suitable apparatus.

Accordingly, the present invention also relates to this process for the production of thermoplastic molding compositions of components a. and b. and optionally known additives.

The molding compositions according to the invention may be used for the production of moldings of all kinds, more especially by injection molding. Examples of moldings which may be produced from the molding compositions according to the invention include machine housings, parts for the automotive field and building field and components for electrical equipment.

Moldings may also be produced by deep drawing from sheets and films.

EXAMPLES

Polymers used:

a1. Thermoplastic copolymer of 55.5 parts by weight methyl methacrylate, 34.5 parts by weight α-methyl styrene and 10 parts by weight acrylonitrile, L-value 49, prepared by emulsion polymerization.

a2. Thermoplastic copolymer of 55 parts by weight methyl methacrylate, 25 parts by weight o-methyl styrene and 20 parts by weight acrylonitrile, L-value 44, prepared by emulsion polymerization.

a3. Thermoplastic copolymer of 45 parts by weight methyl methacrylate, 35 parts by weight α-methyl styrene and 20 parts by weight acrylonitrile, L-value 45, prepared by emulsion polymerization.

a4. Thermoplastic copolymer of 20 parts by weight methyl methacrylate, 50 parts by weight α-methyl styrene and 30 parts by weight acrylonitrile, L-value 51, prepared by emulsion polymerization.

a5. Thermoplastic copolymer of 40 parts by weight methyl methacrylate, 40 parts by weight α-methyl styrene and 20 parts by weight acrylonitrile, L-value 48, prepared by emulsion polymerization.

b1. Statistical copolymer of 88 parts by weight styrene and 12 parts by weight maleic acid anhydride, $M_w$ 190 kg/mol and $M_n$ 82 kg/mol, prepared by mass polymerization.

b2. Statistical thermoplastic copolymer of 83 parts by weight styrene and 17 parts by weight maleic acid anhydride, $M_w$ 170 kg/mol and $M_n$ 82 kg/mol, prepared by mass polymerization.

b3. Statistical thermoplastic copolymer of 80 parts by weight styrene and 20 parts by weight maleic acid anhydride, $M_w$ 180 kg/mol and $M_n$ 90 kg/mol, prepared by mass polymerization.

The L-value is the specific viscosity of a polymer solution in dimethyl formamide (as measured at 20° C.) at a concentration of 5 g/l divided by that concentration.

The weight average $M_w$ and number average $M_n$ of the molecular weight were determined by gelchromatographic analysis of the copolymers using a polystyrene standard for comparison.

Sample preparation

Cast films:

Cast films were prepared by dissolving components a and b in the desired mixing ratio in methylene chloride and by casting the solution, evaporating the solvent at room temperature and drying in a slight vacuum at 50 to 70° C.

Injection molded parts:

Components a and b were compounded in the desired mixing ratio in a 1.3 liter internal kneader at a temperature of 200 to 220° C. The injection-molded parts (1/8" ASTM bar) were made in an injection molding machine at 260° C.

Determination of glass temperature:

The glass temperature was determined using a Perkin-Elmer DSC 2 differential calorimeter. Each sample was heated twice from +10° C. to 200° C. at a rate of 20K/minute under nitrogen as inert gas. After the first heating, the sample was cooled to 10° C. in the calorimeter at a rate of 320K/minute. The measurement was made during the second heating.

A Rheometric RDS 7700 dynamic spectrometer (measuring frequency 1 Hz) was used to determine the glass point by measurement of shear modulus. The measurement was performed on the injection molded parts in the starting condition.

Determination of deflection temperature under load:

The deflection temperature under load according to Vicat (method B) was determined in accordance with DIN 53 460.

The compositions of the mixtures and the measurement results obtained are shown in the following Tables.

TABLE 1

| Components | | | | Glass temperature (DSC) (°C.) | Glass temperature (shear modulus) (°C.) | Vicat B/120 (DIN 53 460) (°C.) |
|---|---|---|---|---|---|---|
| a1 parts by weight | b1 parts by weight | b2 part by weight | b3 parts by weight | | | |
| 100 | — | — | — | 112 | 118 | 117 |
| 90 | 10 | — | — | 112 | 119 | 117 |
| 70 | 30 | — | — | 122 | 120 | 120 |
| 50 | 50 | — | — | 125 | 123 | 120 |
| 30 | 70 | — | — | 126 | 125 | 126 |
| 10 | 90 | — | — | 127 | 128 | 126 |
| — | 100 | — | — | 128.5 | 128 | 128 |
| 90 | — | 10 | — | 118 | 120 | 118 |
| 70 | — | 30 | — | 122 | 124 | 123 |
| 50 | — | 50 | — | 129 | 129 | 128 |
| 30 | — | 70 | — | 133 | 133 | 130 |
| 10 | — | 90 | — | 135.5 | 135 | 134 |
| — | — | 100 | — | 137.5 | 138 | 135 |
| 90 | — | — | 10 | 117.5 | — | — |
| 80 | — | — | 20 | — | 123 | 118 |
| 70 | — | — | 30 | 119.5 | — | — |
| 60 | — | — | 40 | — | 129 | 126 |
| 50 | — | — | 50 | 122.5 | — | — |

TABLE 1-continued

| Components | | | | Glass temperature (DSC) (°C.) | Glass temperature (shear modulus) (°C.) | Vicat B/120 (DIN 53 460) (°C.) |
|---|---|---|---|---|---|---|
| a1 parts by weight | b1 parts by weight | b2 part by weight | b3 parts by weight | | | |
| 40 | — | — | 60 | — | 133 | 131 |
| 30 | — | — | 70 | 132 | — | — |
| 20 | — | — | 80 | — | 138 | 135 |
| 10 | — | — | 90 | 137 | — | — |
| — | — | — | 100 | 141.5 | 141 | 139 |

TABLE 2

| Components | | | | Glass temperature (DSC) (°C.) |
|---|---|---|---|---|
| a2 parts by weight | b1 parts by weight | b2 parts by weight | b3 parts by weight | |
| 100 | — | — | — | 97/— |
| 75 | 25 | — | — | 101/115 |
| 50 | 50 | — | — | 105/121 |
| 25 | 75 | — | — | 110/126 |
| — | 100 | — | — | —/128 |
| 75 | — | 25 | — | 104/122 |
| 50 | — | 50 | — | 108/129 |
| 25 | — | 75 | — | 113/133 |
| — | — | 100 | — | —/137 |
| 75 | — | — | 25 | 101/122 |
| 50 | — | — | 50 | 110/132 |
| 25 | — | — | 75 | —/134 |
| — | — | — | 100 | —/140 |

TABLE 3

| Components | | | | Glass temperature (DSC) (°C.) |
|---|---|---|---|---|
| a3 parts by weight | b1 parts by weight | b2 parts by weight | b3 parts by weight | |
| 100 | — | — | — | 106/— |
| 75 | 25 | — | — | 110/115 |
| 50 | 50 | — | — | 114/122 |
| 25 | 75 | — | — | 116/125 |
| — | 100 | — | — | —/128 |
| 75 | — | 25 | — | 111/125 |
| 50 | — | 50 | — | 113/130 |
| 25 | — | 75 | — | 121/132 |
| — | — | 100 | — | —/137 |
| 75 | — | — | 25 | 112/129 |
| 50 | — | — | 50 | 115/133 |
| 25 | — | — | 75 | 1123/136 |
| — | — | — | 100 | —/140 |

TABLE 4

| Components | | | Glass temperature (DSC) (°C.) |
|---|---|---|---|
| a4 parts by weight | a5 parts by weight | b3 parts by weight | |
| 100 | — | — | 105/— |
| 80 | — | 20 | 108/121.5 |
| 60 | — | 40 | 114/131.5 |
| 40 | — | 60 | 116/135 |
| 20 | — | 80 | 120/139 |
| — | — | 100 | —/140 |
| — | 100 | — | 108/— |
| — | 80 | 20 | 111/125 |
| — | 60 | 40 | 114/130 |
| — | 40 | 60 | 118.5/135 |
| — | 20 | 80 | 125/137 |

Table 1 shows that mixture of the mixtures of copolymers a and b according to the invention have only one glass point.

Tables 2, 3 and 4 show that mixtures of copolymers a and b with a composition differing from the invention have two glass points.

We claim:

1. Thermoplastic molding compositions containing
   a. from 1 to 99 parts by weight of a thermoplastic copolymer of
      from 40 to 70 parts by weight methyl methacrylate, from 20 to 50 parts by weight α-methyl styrene and from 5 to 15 parts by weight acrylonitrile,
   b. from 1 to 99 parts by weight of a statistical thermoplastic copolymer of
      from 70 to 95 parts by weight styrene and from 5 to 30 parts by weight maleic acid anhydride.

2. Thermoplastic molding compositions as claimed in claim 1, in which
   a. contains from 50 to 60 parts by weight methyl methacrylate, from 30 to 40 parts by weight α-methyl styrene and from 7 to 13 parts by weight acrylonitrile in copolymerized form.

3. Thermoplastic molding compositions as claimed in claim 1, in which
   a. contains 55.5 parts by weight methyl methacrylate, 34.5 parts by weight α-methyl styrene and 10 parts by weight acrylonitrile in copolymerized form.

4. Thermoplastic molding compositions as claimed in claim 1, in which
   b. contains from 78 to 90 parts by weight styrene and from 10 to 22 parts by weight maleic acid anhydride in copolymerized form.

* * * * *